United States Patent [19]

Matsuda et al.

[11] Patent Number: 4,650,024
[45] Date of Patent: Mar. 17, 1987

[54] REAR WHEEL STEERING DEVICE FOR MOTORCYCLES

[75] Inventors: Atsushi Matsuda, Iwata; Toshiyuki Sato, Fukuroi, both of Japan

[73] Assignee: Yamaha Motor Co., Ltd., Japan

[21] Appl. No.: 825,399

[22] Filed: Feb. 3, 1986

[51] Int. Cl.⁴ .............................................. B62K 21/00
[52] U.S. Cl. .................................................. 180/219
[58] Field of Search ............... 180/219, 220, 222, 223, 180/224, 227, 140; 280/267, 269, 266, 91

[56] References Cited

U.S. PATENT DOCUMENTS

| | | | |
|---|---|---|---|
| 602,034 | 4/1898 | Murphy | 280/266 |
| 4,157,739 | 6/1979 | Frye | 180/224 |
| 4,557,493 | 12/1985 | Sano et al. | 280/91 |

*Primary Examiner*—John A. Pekar
*Attorney, Agent, or Firm*—Harness, Dickey & Pierce

[57] ABSTRACT

A steering mechanism for a motorcycle or the like wherein the front and rear wheels are steered in response to operator input steering of the front wheel. The steering ratio between the front and rear wheels changes in response to a vehicle condition such as the amount of steering of the front wheel.

16 Claims, 6 Drawing Figures

REAR WHEEL STEERING DEVICE FOR MOTORCYCLES

BACKGROUND OF THE INVENTION

This invention relates to a rear wheel steering device for motorcycles and more particularly to an improved and simplified arrangement for steering both the front and rear wheels of a vehicle such as a motorcycle.

Most vehicles intended for use on public roads for transportation are designed so that they include one or more steered front wheels and one or more non-steered rear wheels. Motorcycles are typical examples of this type of vehicle wherein there is a steered front wheel and a non-steered driven rear wheel. Although such an arrangement offers the advantage of simplicity, it does not necessarily offer the best handling when rounding curves or changing directions. That is, when turning, the front wheel is steered into the direction of the turn but the rear wheel is still pointed in a direction tending to go straight ahead. This can cause difficulties in handling.

It is, therefore, a principal object of this invention to provide an improved steering arrangement for vehicles wherein both the front and rear wheels are steered.

It is a further object of this invention to provide a steering mechanism for vehicles that will improve their handling.

If it is desired to steer the rear wheel as well as the front wheel of a vehicle, it is important that the steering relationship between the front and rear wheels be accurately and positively controlled. It is, therefore, a still further object of this invention to provide a device for positively steering the rear wheel of a vehicle in response to steering movement of its front wheel.

It is a further object of this invention to provide an improved rear wheel steering mechanism for a motorcycle wherein the steering is controlled by the positioning of the front wheel.

In connection with the steering of the rear wheel in response to the steering movement of the front wheel, the desirable steering ratio between the front and rear wheels may vary in response to a number of conditions. For example, the ratio of rear wheel steering to front wheel steering can depend upon vehicle speed and also can depend upon the amount of steering input to the front wheel. It is, therefore, a still further object of this invention to provide an improved rear wheel steering mechanism in which the steering ratio between the front and rear wheels can be altered.

It is another object of this invention to provide a rear wheel steering mechanism for a motorcycle wherein the steering ratio between the front and rear wheels change in response to vehicle conditions.

SUMMARY OF THE INVENTION

This invention is adapted to be embodied in a vehicle having at least one dirigible front wheel steered by an operator and at least one rear wheel. Means are provided for supporting the rear wheel for steering movement, means mechanically couple the front wheel to the rear wheel for simultaneous steering movement, and means are incorporated for changing the steering ratio between the front and rear wheels.

DETAILED DESCRIPTION OF THE PREFERRED EMBODIMENT

Figure 1:
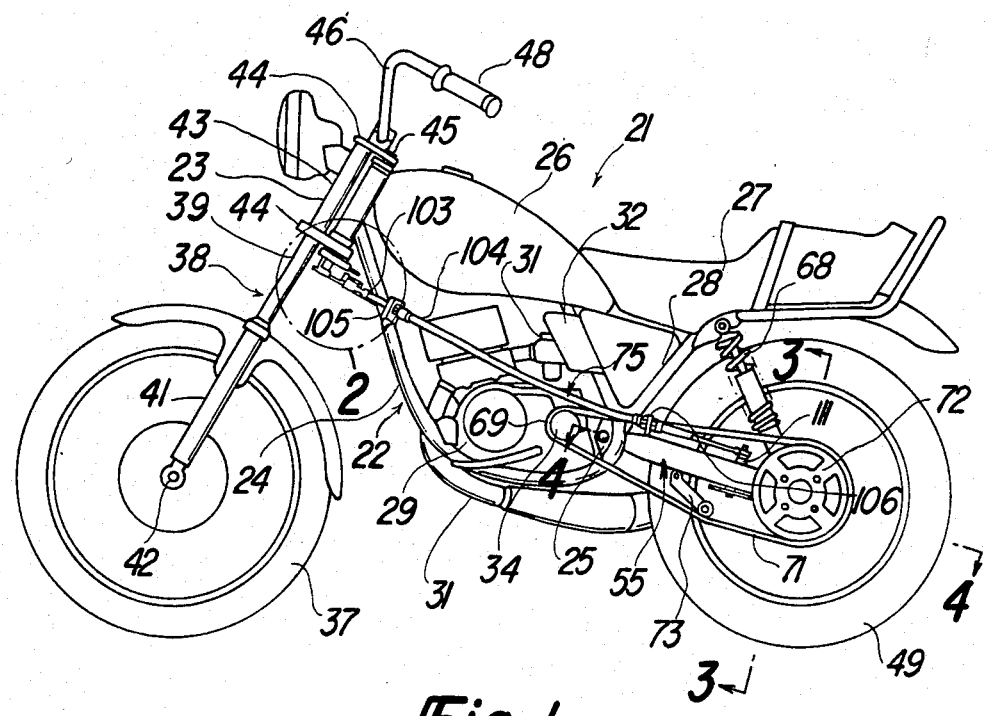
FIG. 1 is a side elevational view of a motorcycle constructed with an embodiment of the invention.

Referring initially primarily to FIG. 1, a motorcycle constructed in accordance with this embodiment is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube 20, a down tube 24 and a bracket 25 that is affixed to the down tube and a rearwardly and downwardly projecting portion of the main tube. A fuel tank 26 is supported on the main tube and is positioned forwardly of a seat 27 that is supported on a seat rail and a seat pillar rail 28 of the frame assembly 22. Since the frame assembly per se forms no part of the invention, a further description of it is believed to be unnecessary.

An internal combustion engine, indicated generally by the reference numeral 29, is supported within the frame assembly 22 in a known manner. In the illustrated embodiment, the engine 29 is depicted as being of the reciprocating type and has one or more cylinders that receive a fuel/air charge from a carburetor 31 that is positioned rearwardly of the cylinder block and which extends in a generally horizontal direction. An air cleaner and air silencer assembly 32, which is positioned within the frame 22 rearwardly of the carburetors 31 and beneath the seat 27, supplies air to the carburetor 31. In addition, the engine 29 is provided with an exhaust system 33 for silencing the exhaust gases and discharging them to the atmosphere. The engine 29 also includes a combined crankcase, transmission assembly that drives an output shaft 34 at any of a plurality of selected speed ratios.

A front wheel 37 is supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 having a tubular suspension system 41 that carries the front wheel 37 for rotation about an axis 42 at its lower end. The system 41 is supported for vertical movement relative to an upper portion 43 so as to accommodate controlled suspension movement for the front wheel 37.

Upper and lower brackets 44 connect the front fork upper portion 39 to a steering shaft 45 that is journaled for rotation about a front steering axis is journaled in the head pipe 23. A handlebar assembly 46 is connected to the brackets 44 and steering shaft 45 and carries hand grips 48 at its outer end. It should be readily apparent that a rider positioned on the seat 27 may steer the front wheel 37 through the hand grips 48 and handlebar 46.

Figure 3:
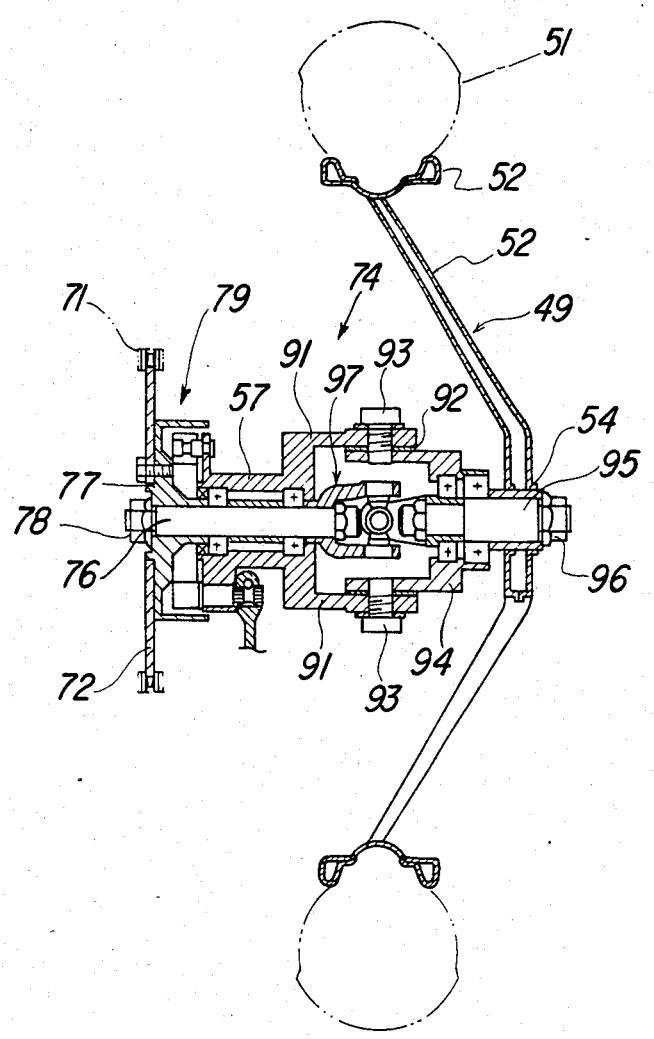
FIG. 3 is an enlarged cross-sectional view taken along the line 3—3 of FIG. 1.
Figure 4:
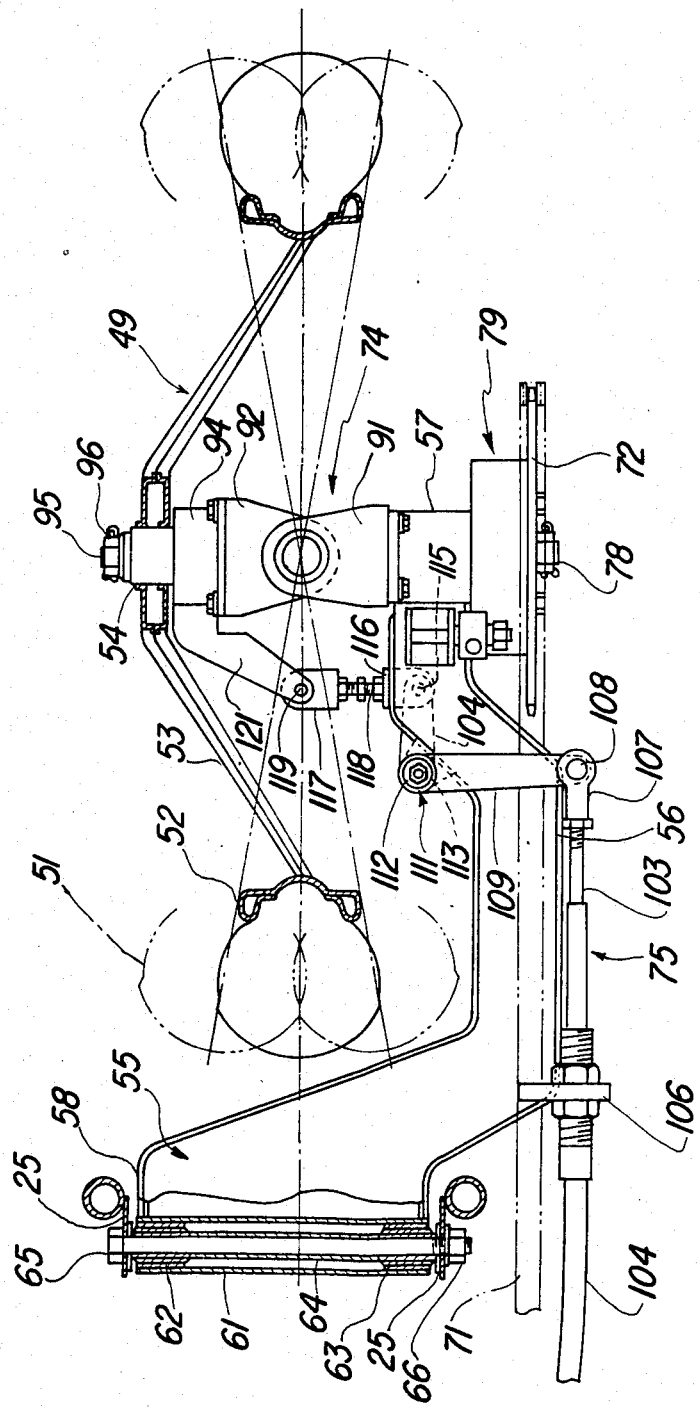
FIG. 4 is an enlarged cross-sectional view taken along the line 4—4 of FIG. 1.

A driven rear wheel assembly, indicated generally by the reference numeral 49, is carried at the rear end of the frame assembly 22 in a manner to be described (FIGS. 3 and 4). The rear wheel 49 includes a tire 51 that is mounted on a rim 52 that is carried by spokes 53 and connected to a hub portion 54.

It should be noted that the motorcycle 21 as thus far described is generally conventional in configuration and, for that reason, only the general construction has been described in detail.

The rear wheel 49 is supported for suspension movement relative to the frame 22 by means that include a trailing arm assembly, indicated generally by the reference numeral 55 and shown in most detail in FIG. 4. Because of differences which will be described, the trailing arm assembly 53 includes one rearwardly extending arm portion 56 that lies on only one side of the rear wheel assembly 49 and which supports the rear wheel assembly by means of a hub carrier 57 that is fixed at its trailing end in a manner to be described. Forwardly of the rearwardly extending portion 56, the trailing arm 55 has a main portion 58 that extends substantially across the width of the motorcycle between the brackets 25 and which is formed of a welded up box section. This box section has a tube 61 carried at its forward end, which tube is, in turn, journaled on a pair of axial spaced bushings 62 and 63 that are, in turn, journaled on a shaft 64 that is carried in the brackets 25. The shaft 64 is held in place by means of an elongated bolt 65 that extends through the interior of the shaft 64 and which is held in place by a nut 66.

The suspension travel of the rear wheel 49 and trailing arm 55 are controlled by a combined coil spring and shock absorber unit 68 that is loaded between the rear end of the arm portion 56 and the frame 22 at a point contiguous to where the seat pillar 28 joins the seat rail.

The rear wheel 49 is driven and to this end a driving sprocket 69 is affixed to the engine transmission output shaft 34. A driving chain 71 encircles the sprocket 69 and a driven sprocket 72 that is affixed for rotation with the rear wheel 49 in a manner which will be described. A chain tensioner 73 is carried by the trailing arm 55 so as to maintain uniform tension on the driving chain 71 during its suspension movement.

In addition to being driven and supported for suspension movement, the rear wheel assembly 49 is also supported for steering movement by means of a steering support, indicated generally by the reference numeral 74. The steering support 74 is designed so as to provide a steering axis that passes through the transverse center of the rear wheel assembly 49 and which lies on a plane passing through the center of the motorcycle 21 and containing the front wheel steering axis.

The steering of the rear wheel 49 about its steering axis is controlled by means of a steering control mechanism, indicated generally by the reference numeral 75 which connects the front wheel steering mechanism with the rear wheel steering support mechanism 74 in a manner to be described.

Referring now primarily to FIGS. 3 and 4, the rear wheel steering support mechanism 74 will be described in detail. The hub carrier 57 has a pair of spaced apart bearings that rotatably journal a shaft 76. The shaft 76 has a splined connection to a hub member 77 which is, in turn, affixed to the sprocket 72 by means of bolt assemblies. The sprocket 72 and hub member 77 are axially affixed to the shaft 76 by means of a nut 78.

The hub member 77 forms a portion of a drum brake assembly, indicated by the reference numeral 79. This drum brake assembly is of any known type.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis of the rear wheel assembly 49 and also within the center plane of the mtorcycle 21.

The further bifurcated member 92 is affixed to a second hub carrier 94 which, in turn, journals a shaft 95 by means of a pair of spaced bearings. The shaft 95 is nonrotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its respectively members affixed to the shafts 76 and 95. The universal joint 97 has its pivotal axis lying on the steering axis of the rear wheel 49 so that the steering movement of the rear wheel assembly 49 will not interfere with the driving forces transmitted to the rear wheel through the universal joint 97.

The steering control mechanism 75 is provided for mechanically coupling the front wheel steering mechanism to the mechanism for steering the rear wheel 74 so that both wheels will be steered in unison and for changing the steering ratio between the front and rear wheels in response to a vehicle condition, as will be described. This mechanism includes a cam and follower mechanism indicated generally by the reference numeral 101 that transmits front wheel steering inputs to one end of a flexible transmitter 103 that is contained within a protective sheath 104. The adjacent forward end of the protective sheath 104 is carried by the down tube 24 and specifically by means of a bracket 105 that is connected to it.

The rear end of the protective sheath 104 is fixed adjustably to a bracket 106 carried by the trailing arm assembly 55. The rear end of the wire actuator 103 is connected by means of a trunion 107 and pivot pin 108 to one arm 109 of a bellcrank assembly 111. The bellcrank assembly 111 is supported for pivotal movement about a vertically extending axis by means of a pivot pin 112 that is carried by a bracket 113 that is affixed to the trailing arm portion 56. Another arm 114 of the bellcrank 111 is connected by means of a pivot pin 115 to a trunion 116. The trunion 116 is connected to a further trunion 117 by means of a turn buckle assembly 118 so as to permit adjustment between the trunions 116 and 117. The trunion 117 is, in turn, connected by means of a pivot pin 119 to a steering arm 121 that is formed integrally with or affixed to the hub carrier 94.

Figure 2:
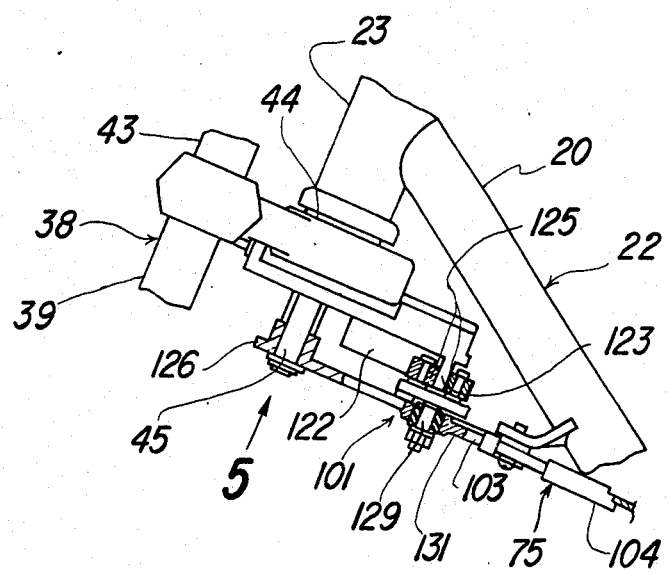
FIG. 2 is an enlarged view showing the area encompassed within the circle 2 in FIG. 1, with a portion broken away and shown in section.
Figure 5:
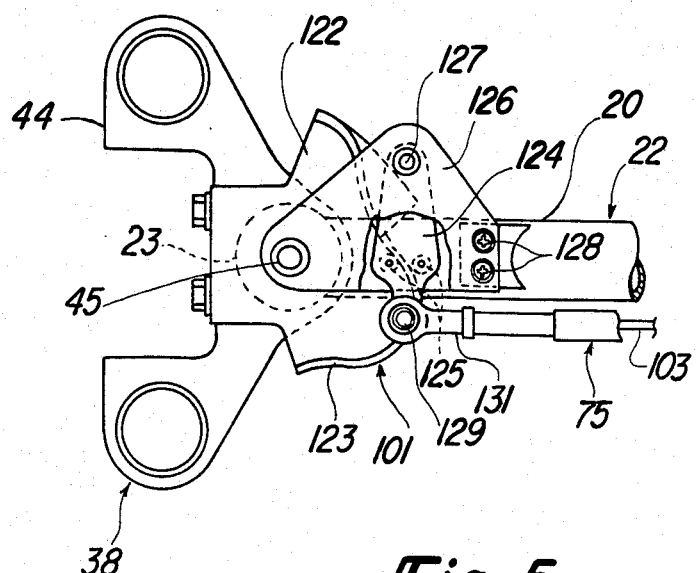
FIG. 5 is an enlarged view looking in the direction of the arrow 5 in FIG. 2.
Figure 6:
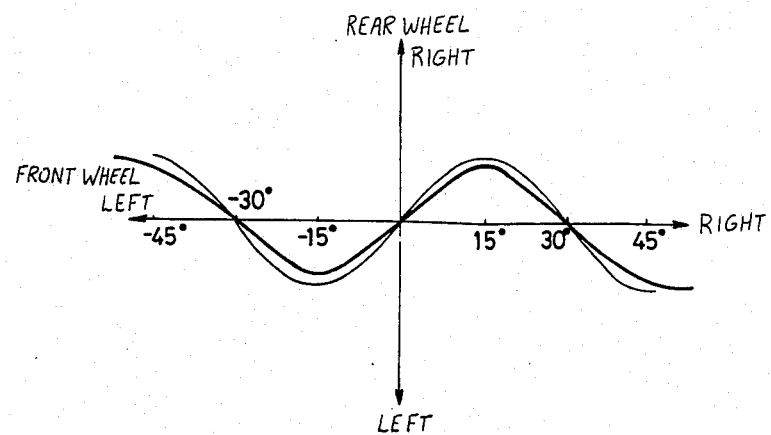
FIG. 6 is a diagrammatic view showing the steering ratio between the front and rear wheels in accordance with the illustrated embodiment.

The construction of the cam and follower mechanism 101 may be best understood by reference to FIGS. 2 and 5 and its operation in effecting a change in the ratio between the steering of the front and rear wheels 37 and 49 in response to vehicle conditions may be understood by reference to FIG. 6.

Referring first to FIGS. 2 and 5, a cam plate 122 is affixed to the underside of the lowermost fork bracket 44 in a suitable manner and is rotatable with it. The cam plate 122 has a cam surface in the form of a down turned flange 123.

A follower lever 124 carries a pair of spaced apart rollers 125 that are engaged with opposite sides of the cam flange 123. The follower lever 124 is, in turn, pivotally supported on a bracket 126 by means of a pivot pin 127. The bracket 126 is affixed to the main frame tube 5 by means of a pair of threaded fasteners 128. In addition, the steering shaft 45 passes through and rotates relative to the bracket 126 as may be seen in FIG. 2.

The follower lever 124 is connected by means of a pivot pin 129 to a trunnion 131. The trunnion 131 is, in turn, affixed to the flexible transmitter 103 in a suitable manner.

The device operates in the following manner. If the rider steers the motorcycle by rotating the handlebars 46, the fork bracket 44 will rotate along with the front fork 41 and front wheel 37. This rotation causes the cam 123 to move and its shape will effect pivotal movement of the follower lever 124 to reciprocate the wire transmitter 103. This reciprocation will be transmitted into pivotal movement of the bellcrank 109 and transmitted through the turnbuckle 118 into movement of the steering arm 121 so as to steer the rear wheel 49.

The steering ratio between the front and rear wheels may be understood by reference to FIG. 6 wherein the steering angle of the front wheel is indicated on the abscissa while the steering movement of the rear wheel is indicated on the ordinate. Movement to the right is indicated in the positive direction and movement to the left is indicate in the negative direction. It should be noted as the front wheel is steered to the right, the rear wheel will also be steered to the right at a somewhat linear angle until the front wheel has been turned through approximately 15°. At that time, the amount of steering of the rear wheel will decrease relative to the steering of the front wheel and eventually when the front wheel has been steered through about 30°, the rear wheel will then begin to be steered through the opposite direction.

The net effect of this is that under high speed steering, under which the front wheel inputs are relatively small, the rear wheel inputs will be relatively small and in the same direction. However, as the angle of steering increases, which is generally done at lower speeds, the amount of input to the rear wheel will be gradually decreased and will, eventually, occur in the opposite direction. This is advantageous when the motorcycle is being pushed by hand and steered. Because of the opposite direction of steering of the rear wheel relative to the front wheel, the steering will be sharper and easier. On the other hand, when traveling at high speeds, the steering of the rear wheel is in the same direction and improves handling. Although these particularly relationships are established by the cam and follower mechanism described, it should be understood that they may be achieved through other types of mechanisms and, in fact, if desired, other steering relationships in response to other vehicle conditions may be employed.

In view of the foregoing, it is believed to be readily apparent that an extremely effective steering mechanism has been provided in which the steering ratios between the front and rear wheels varies in response to a vehicle operating condition, in the illustrated embodiment the amount of front wheel steering, to improve handling and control under all circumstances. Although an embodiment of the invention has been illustrated and described, various changes and modifications may be made without departing from the spirit and scope of the invention, as defined by the appended claims.

We claim:

1. A motorcycle having one dirigible front wheel steered by an operator and one rear wheel, the improvement comprising means for supporting said rear wheel for steering movement, means for mechanically coupling said front and said rear wheels for simultaneous steering movement, and means for changing the steering ratio between the front and rear wheels.

2. A motorcycle as set forth in claim 1 wherein the means for changing the steering ratio between the front and rear wheels changes the steering ratio in response to a motorcycle condition.

3. A motorcycle as set forth in claim 2 wherein the vehicle condition is the amount of steering of the front wheel.

4. A motorcycle as set forth in claim 3 wherein the means for changing the steering ratio between the front and rear wheels changes the steering ratio in a non-linear fashion.

5. A motorcycle as set forth in claim 4 wherein the means for changing the steering ratio comprises a cam and follower mechanism.

6. A motorcycle as set forth in claim 1 further including operator control means for steering the front wheel.

7. A motorcycle as set forth in claim 6 wherein the means for mechanically coupling the front and rear wheel couples the rear wheel steering mechanism to the front wheel steering mechanism.

8. A motorcycle as set forth in claim 7 wherein the coupling means comprises a linkage system.

9. A motorcycle as set forth in claim 8 wherein the front and rear wheels are supported for suspension movement.

10. A motorcycle as set forth in claim 8 wherein at least one of the steered wheels is driven.

11. A motorcycle as set forth in claim 10 wherein the means for changing the steering ratio between the front and rear wheels changes the steering ratio in response to a motorcycle condition.

12. A motorcycle as set forth in claim 11 wherein the vehicle condition is the amount of steering of the front wheel.

13. A motorcycle as set forth in claim 12 wherein the means for changing the steering ratio between the front and rear wheels changes the steering ratio in a non-linear fashion.

14. A motorcycle as set forth in claim 13 wherein the means for changing the steering ratio comprises a cam and follower mechanism.

15. A motorcycle as set forth in claim 14 wherein the front and rear wheels are supported for suspension movement.

16. A motorcycle as set forth in claim 15 wherein the rear wheel is the driven wheel.

* * * * *